(12) United States Patent
Van Atta et al.

(10) Patent No.: US 7,510,279 B2
(45) Date of Patent: Mar. 31, 2009

(54) SPORTS GLASSES LENS ADAPTER

(75) Inventors: Dylan S. Van Atta, Beaverton, OR (US); Umar Hanif, Portland, OR (US)

(73) Assignee: Nike, Inc., Beaverton, OR (US)

( * ) Notice: Subject to any disclaimer, the term of this patent is extended or adjusted under 35 U.S.C. 154(b) by 233 days.

(21) Appl. No.: 11/701,615

(22) Filed: Feb. 2, 2007

(65) Prior Publication Data

US 2008/0186445 A1     Aug. 7, 2008

(51) Int. Cl.
G02C 1/04     (2006.01)
(52) U.S. Cl. .................. 351/105; 351/106; 351/154
(58) Field of Classification Search .................. 351/41, 351/44, 83–89, 103–109, 154
See application file for complete search history.

(56) References Cited

U.S. PATENT DOCUMENTS

| 3,025,761 | A | * | 3/1962 | Beasse ..................... 351/52 |
| 5,387,950 | A | * | 2/1995 | Weltmann ................. 351/178 |
| 6,059,409 | A | | 5/2000 | Sheldon |
| D484,281 | S | | 12/2003 | Gagnon et al. |
| 6,676,257 | B2 | | 1/2004 | Sheldon et al. |
| 6,692,124 | B2 | | 2/2004 | Katz et al. |
| D488,182 | S | | 4/2004 | Sheldon |
| D497,628 | S | | 10/2004 | Sheldon |
| D497,931 | S | | 11/2004 | Sheldon |
| D497,934 | S | | 11/2004 | Sheldon |
| 6,899,427 | B1 | | 5/2005 | Sheldon |
| D507,011 | S | | 7/2005 | Sheldon |
| 6,959,988 | B1 | | 11/2005 | Sheldon |
| 6,971,745 | B2 | | 12/2005 | Sheldon |
| D535,320 | S | | 1/2007 | Sheldon et al. |
| D536,361 | S | | 2/2007 | Sheldon et al. |
| D537,098 | S | | 2/2007 | Sheldon et al. |
| D537,103 | S | | 2/2007 | Sheldon et al. |
| D537,104 | S | | 2/2007 | Sheldon et al. |
| D540,370 | S | | 4/2007 | Sheldon |
| D540,846 | S | | 4/2007 | Sheldon |
| D541,329 | S | | 4/2007 | Sheldon |
| D541,838 | S | | 5/2007 | Sheldon |
| D541,839 | S | | 5/2007 | Sheldon |
| 2003/0223032 | A1 | | 12/2003 | Gagnon et al. |
| 2004/0111779 | A1 | | 6/2004 | Gagnon et al. |
| 2005/0073643 | A1 | | 4/2005 | Sheldon |
| 2005/0210568 | A1 | | 9/2005 | Sheldon |
| 2006/0050227 | A1 | | 3/2006 | Fernandez et al. |

(Continued)

FOREIGN PATENT DOCUMENTS

CA     2430360     11/2003

(Continued)

Primary Examiner—Huy K Mai
(74) Attorney, Agent, or Firm—Chernoff, Vilhauer, McClung & Stenzel, LLP

(57) ABSTRACT

A sports glasses construction includes a frame for semi-rimless lenses having a pair of channels for receiving a first pair of selectively removable lenses of a first radius of curvature, and a pair of lens adapters having respective upper rib members sized and shaped to fit into the respective pair of channels in the frame. The pair of lens adapters each has a lower portion sized and shaped to receive a second respective pair of lenses having a second radius of curvature that is greater than the first radius of curvature.

14 Claims, 4 Drawing Sheets

U.S. PATENT DOCUMENTS

| | | |
|---|---|---|
| 2006/0238698 A1 | 10/2006 | Sheldon |
| 2006/0272067 A1 | 12/2006 | Gagnon et al. |
| 2007/0024806 A1 | 2/2007 | Blanshay et al. |
| 2007/0091261 A1 | 4/2007 | Sheldon |
| 2007/0132944 A1* | 6/2007 | Sheldon .................. 351/86 |

FOREIGN PATENT DOCUMENTS

| | | |
|---|---|---|
| GB | 2376757 A | 12/2002 |
| WO | WO 03102670 | 12/2003 |

* cited by examiner

SPORTS GLASSES LENS ADAPTER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Sports glasses are employed by many athletes in various sports activities. Typically, such sports glasses are of the "wraparound" variety, which provide lenses having a relatively small radius of curvature. Such lenses are called "Base 8" lenses and are frequently tinted or polarized. Sports, such as mountain biking, skiing, and other sports in which rapid motion is a factor, benefit greatly from wraparound sports glasses, which can reduce glare and provide protection from wind and dust. The more popular sports glasses are semi-rimless, which is more aesthetically pleasing and provides better visibility to the user. Semi-rimless sports lenses are typically affixed to a frame along their upper edges but have lower and side edges that are not enclosed by the frame. On conventional framed glasses, the lower portion of the frame blocks a portion of the user's field of view. Additionally, there is better ventilation for the eyes when there is no bottom rim, which would otherwise tend to act like a gasket or seal around the eyes.

The Base 8 curvature enables tinted lenses to extend around to the side of the wearer's eyes to provide greater protection from the elements than is attainable with stock prescription lenses, which are constructed according to a larger radius of curvature (known in the industry as "Base 6".

Notwithstanding the advantages of wraparound lenses having Base 8 curvature, many athletes would like to be able to incorporate prescription lenses into wraparound sports glasses frames. Such frames are sturdier and better suited to certain types of physical activity than conventional prescription glasses frames. Heretofore however, it has been difficult to incorporate prescription lenses into sports glasses designed for Base 8 curvature lenses because prescription lenses are made from stock Base 6 curvature lens blanks and these will not fit into sports glasses frames made for Base 8 curvature lenses.

Adapter rings have been proposed for conventional rimmed sports glasses, which will permit a prescription lens to be secured to a sports glasses frame. An example is shown in Hernandez (Publication No. US2006/0050227). Hernandez shows an adapter ring, which may be press-fitted into a sports glasses frame. The Hernandez design suffers from the problem that it is a rimmed frame and, additionally, the adapter ring provides another obstruction to the peripheral vision of the wearer and blocks ventilation as discussed above. Furthermore, the Hernandez design more closely resembles goggles, which from an aesthetic point of view, are less visually pleasing to many sports enthusiasts.

BRIEF SUMMARY OF THE INVENTION

A sports glasses construction includes a frame for semi-rimless lenses having a pair of channels for receiving a first pair of selectively removable lenses of a first radius of curvature, and a pair of lens adapters having respective upper rib members sized and shaped to fit into the respective pair of channels in the frame. The pair of lens adapters each has a lower portion sized and shaped to receive a second respective pair of lenses having a second radius of curvature that is greater than the first radius of curvature.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENTS

Figure 1:
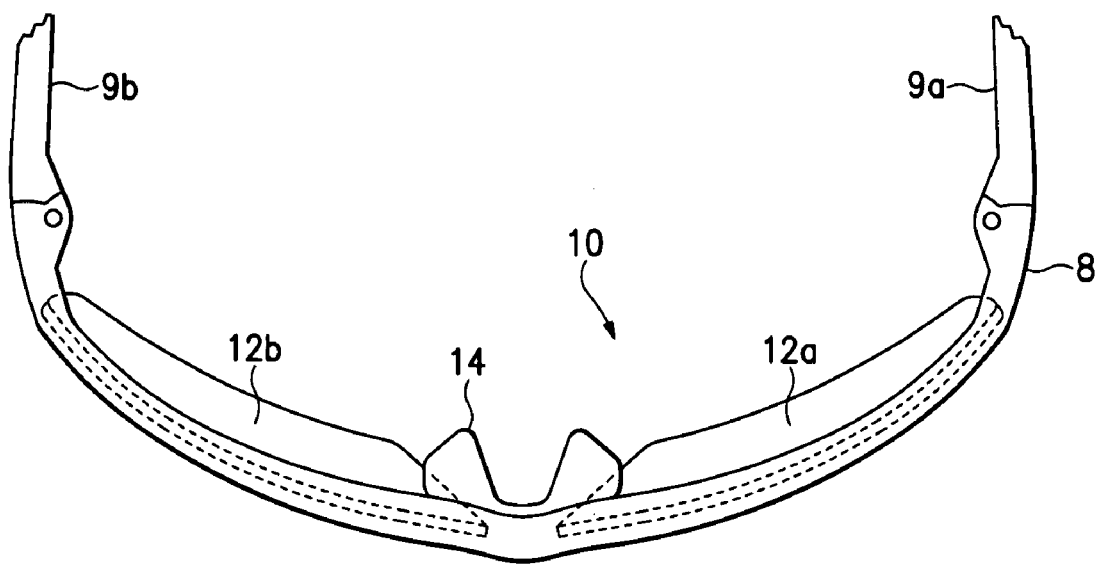
FIG. 1 is a top view of an exemplary semi-rimless sports glasses construction.

A sports glasses construction 10 is shown in FIG. 1 and includes a frame 8 having a pair of articulated retainers 9a and 9b. As is conventional in such constructions, the frame 8 has a nosepiece 14 and the retainers 9a and 9b are curved to engage the ears of the user (not shown). The frame 8 is fitted with a pair of sports lenses 12a and 12b. Sports lenses, such as lenses 12a and 12b, are known as wraparound lenses and typically have a small radius of curvature, which is known in the industry as a "Base 8" curvature. Such lenses are typically non-prescription lenses and may be tinted so as to reduce glare under different types of lighting conditions.

Figure 2:
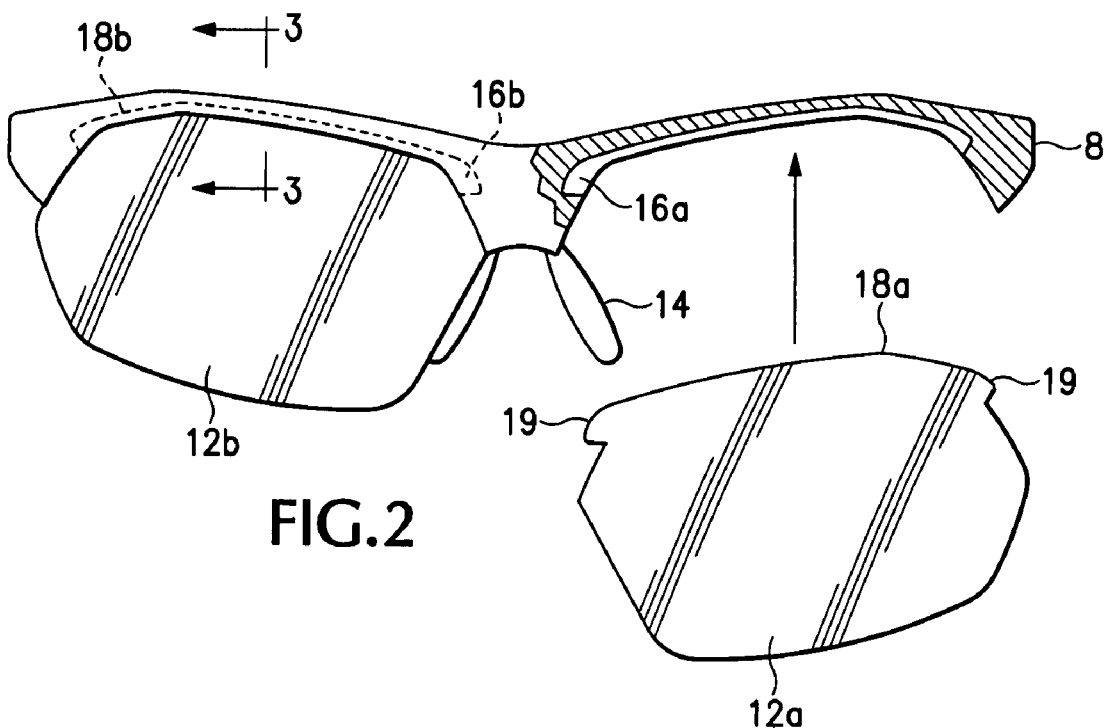
FIG. 2 is a front, partly exploded and partially cut away view of the exemplary sports glasses configuration of FIG. 1.
Figure 3:
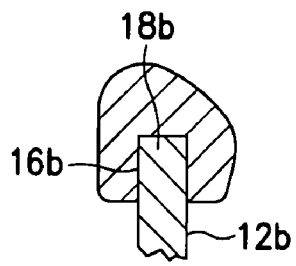
FIG. 3 is a partial cut-away view taken along line 3-3 of FIG. 2.

As shown in FIG. 2, the lenses 12a and 12b are selectively replaceable in the frame 8. On each side of the frame 8, there is a channel 16a, 16b and the lenses 12a and 12b each have an upper edge 18a, 18b that cooperatively fits into the respective channels 16a and 16b. To help retain the lenses in the channels, the lenses have tabs 19 at each end that mate with correspondingly shaped portions of the channels 16a and 16b.

Figure 4:
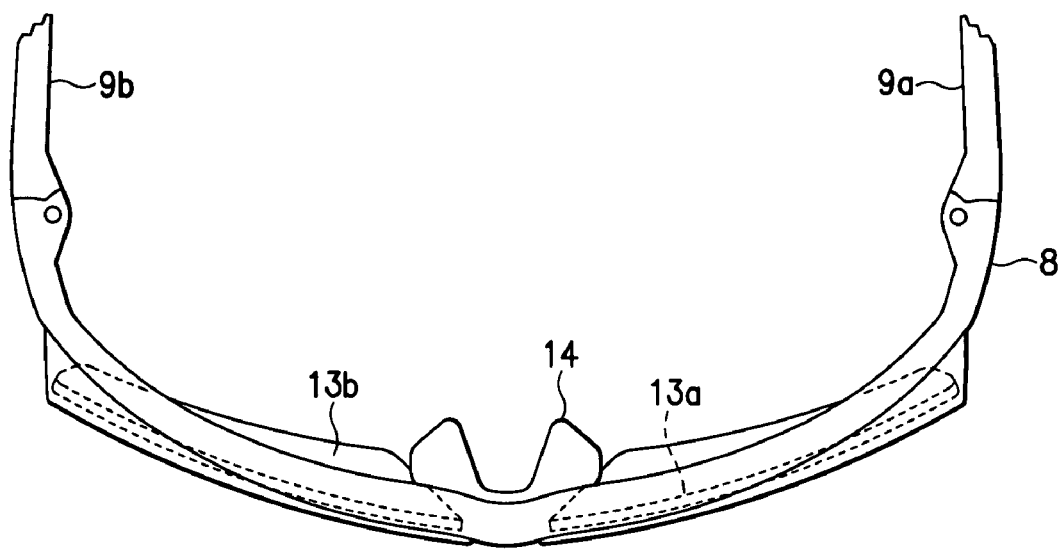
FIG. 4 is a top view of the sports glasses construction of FIG. 1 including an adapter for using prescription lenses in the sports glasses frame of FIG. 1.

Referring to FIG. 4, the frame 8 is now fitted with lenses 13a and 13b having a larger radius of curvature, conventionally know as "Base 6" curvature. For example, prescription lenses, because of the requirements for thicknesses in certain prescriptions, are thicker than tinted sports lenses (such as the lenses 12a and 12b) and cannot easily be made with Base 8 curvature. To do so requires an expensive process that may make the cost of such lenses prohibitive.

Figure 5:
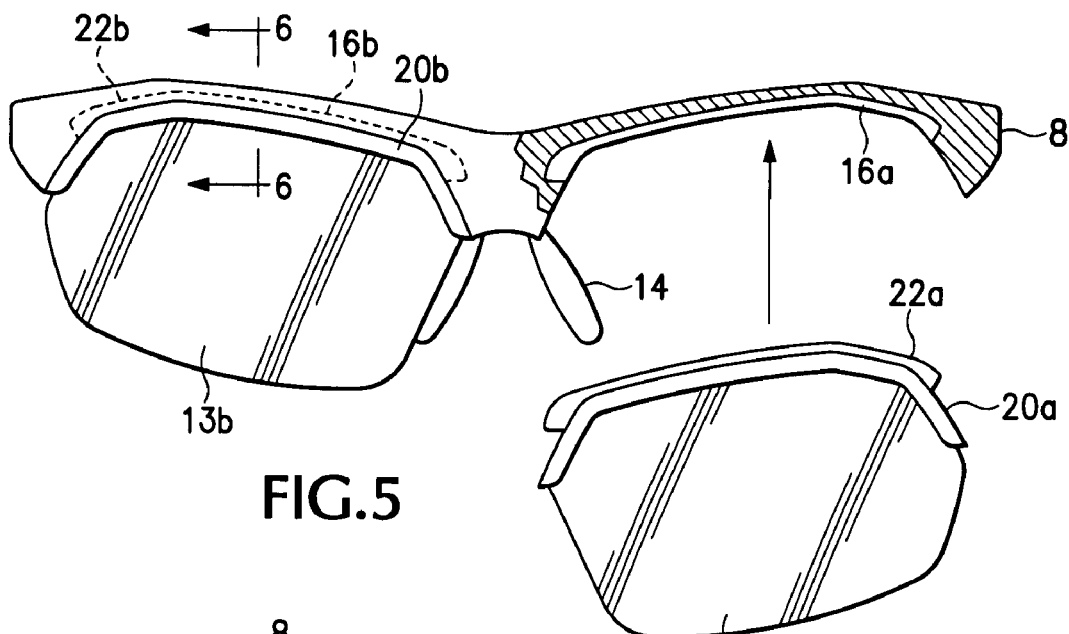
FIG. 5 is a front, partial cut-away, partially exploded, view of the sports glasses construction of FIG. 4.
Figure 6:
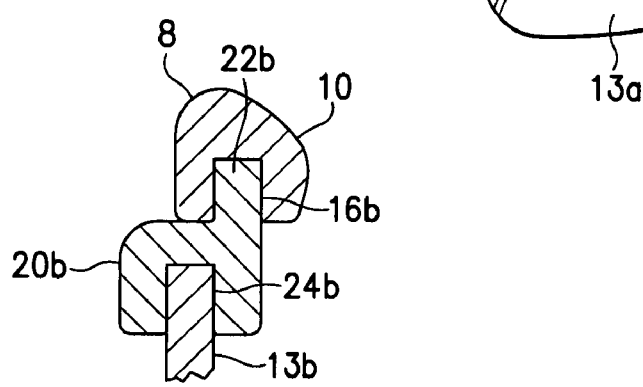
FIG. 6 is a partial cut-away view taken along line 6-6 of FIG. 5.
Figure 7:
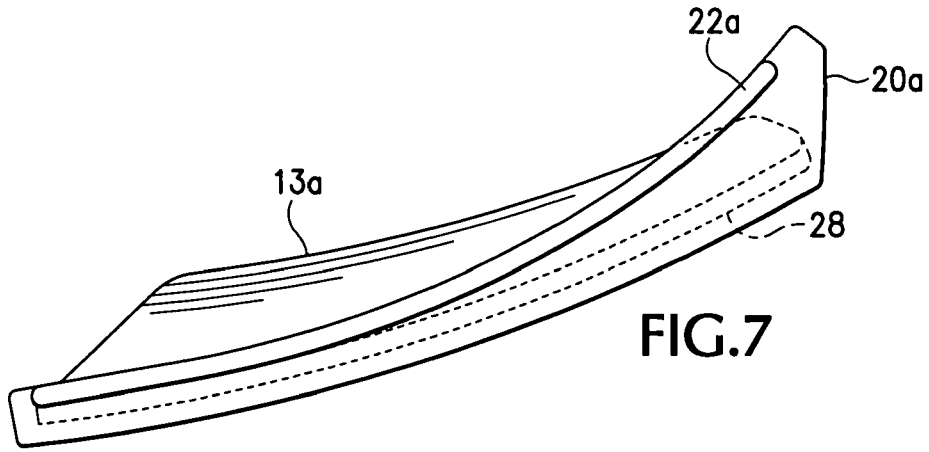
FIG. 7 is a top view of an adapter for the sports glasses frame of FIG. 4.
Figure 8:
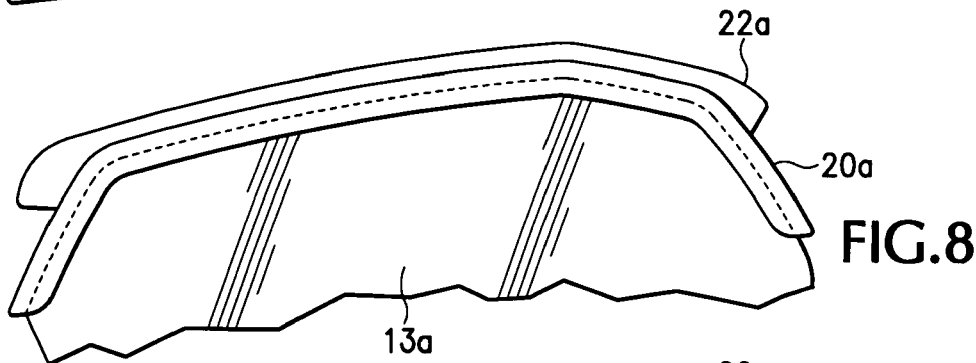
FIG. 8 is a partial front view of the adapter and lens shown in FIG. 7.
Figure 10:
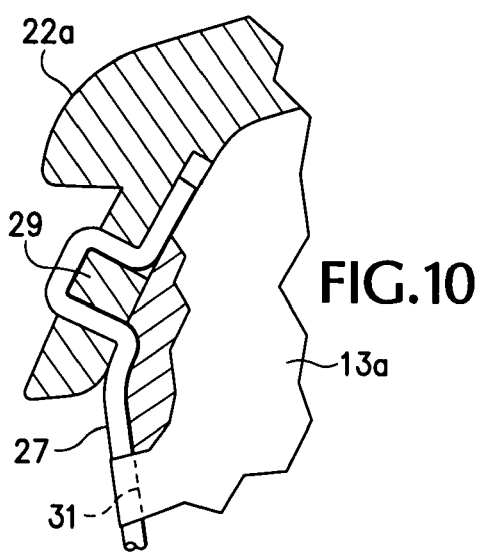
FIG. 10 is a partial cut-away front view of an adapter employing an eyewire for coupling a lens to the adapter.

The frame 8 is designed for a semi-rimless configuration, which means that the bottom edges and at least a portion of the side edges of the lenses 13a and 13b are exposed and not enclosed by a rim. In order to fit the lenses 13a and 13b into the frame 8, a pair of adapters 20a and 20b are provided. As shown best in FIGS. 5 and 6, the adapters 20a, 20b each have an upper portion comprising ribs 22a and 22b. These ribs are shaped and sized the same as the upper portions 18a and 18b of lenses 12a and 12b. Thus, the ribs 22a and 22b fit easily into the channels 16a and 16b of the frame 8. The lower portion of each of the adapters 20a and 20b is shown best in FIG. 6. Each of the lenses 13a and 13b fits into adapter channels, such as channel 24b shown in FIG. 6. In the embodiment of FIG. 6, an eyewire arrangement (as shown best in FIG. 10) is used to secure the lenses 13a and 13b to the adapters 20a and 20b. In this embodiment, each of the lenses 13a and 13b have a peripheral groove 31 in the outer portion of the lens which is not supported by a rim. An eyewire 27 runs through the groove 31 and is secured to the adapter 20a by a locking channel guide 29. Such locking channel guides are well known in the art and are a conventional way of connecting eyeglasses to spectacles frames using a nylon eyewire or the like. Additionally, with some types of guides, the channels (see channel 24b) may not be necessary and the lenses 13a, 13b may bear directly against the underside of the adapters 20a, 20b.

Figure 9:
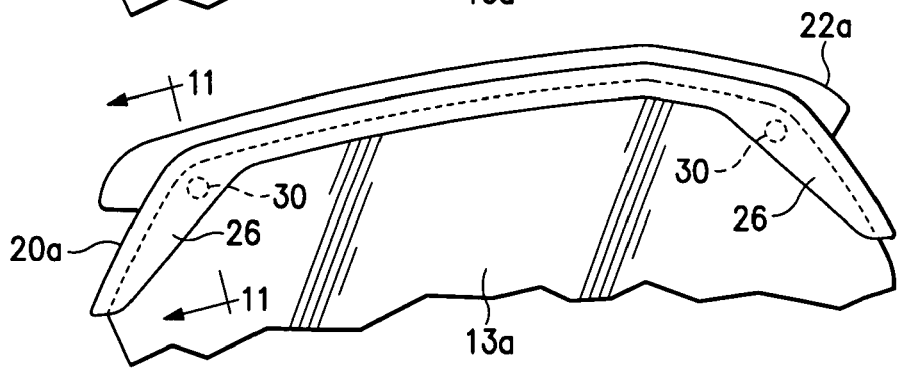
FIG. 9 is a front view of a second embodiment of an adapter and lens combination for use in the sports glasses frame of FIG. 1.
Figure 11:
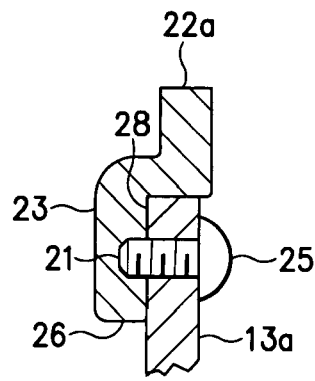
FIG. 11 is a partial cut-away view taken along the line 11-11 of FIG. 9.

An alternative method of construction is shown in FIGS. 9 and 11. In FIG. 9, the adapter 20a has been modified to provide a pair of widened side portions 26. The side portions 26 provide enough inner surface area in this portion of the adapter to receive a pair of screws 25, which are inserted through apertures 30 in the lens 13a. Inner surfaces of side portions 26 contain complimentary screw holes 21 having a spacing matched to the apertures 30. As shown best in FIG. 11, the front lower portion 23 of the adapter 20a protrudes downwardly forming a rib with an inner lower surface 28. In this embodiment, the inner lower surface 28 of the adapter 20a is curved to conform substantially to the radius of curvature of the lens 13a. One advantage of this embodiment is to eliminate the need to provide a channel of the exact thickness of the lens because prescription lenses differ in thickness.

Figure 12:
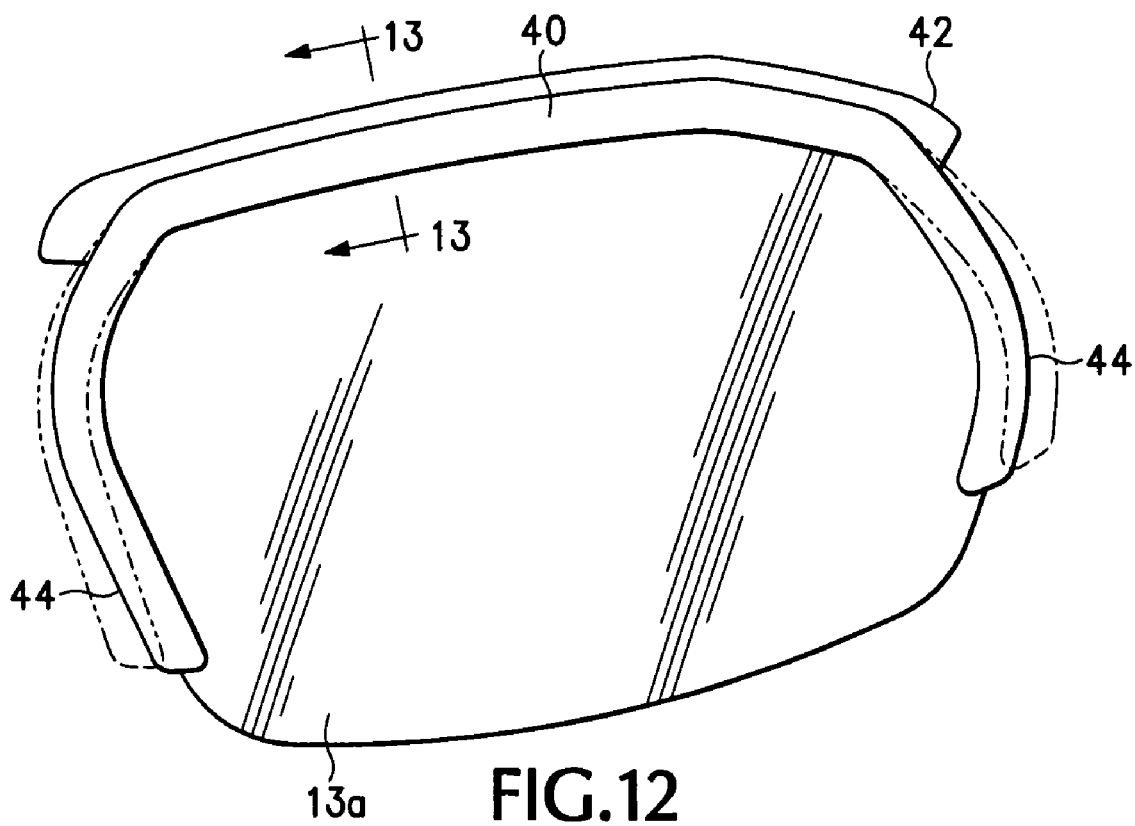
FIG. 12 is a front view of a third embodiment of an adapter and rimless lens combination.
Figure 13:
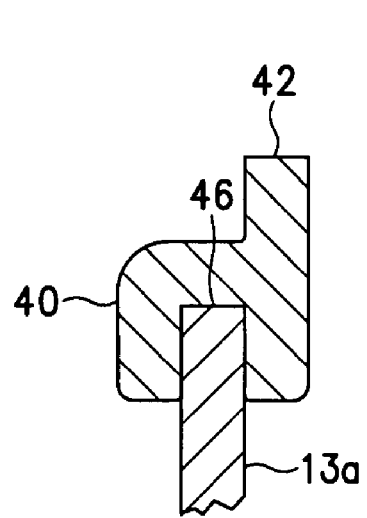
FIG. 13 is a partial cut-away view taken along line 13-13 of FIG. 12.
Figure 14:
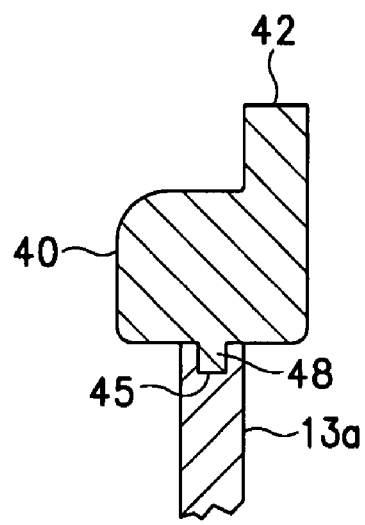
FIG. 14 is a partial cut-away view of a second embodiment of the adapter and lens shown in FIG. 12 using a grooved rimless lens.

Yet another variation of a sports glasses construction is shown in FIGS. 12, 13 and 14. Referring to FIG. 12, an adapter 40 includes a pair of side arms 44 that flex to receive the lens 13a securely within a channel 46 as shown in FIG. 13. In another variation of this construction, the lenses 13a and 13b (not shown) are grooved so as to receive a rib portion 48 protruding from the bottom of the adapter 40, which fits into a groove 45 in the periphery of the lens 13a.

In the embodiments of FIGS. 9-14, the adapter includes either a lower surface or a channel or a protruding rib whose radius of curvature substantially corresponds to that of the larger radius of curvature of the prescription lenses.

The precise manner of securing the lenses to the adapters is unimportant for purposes of the invention and a number of such securing methods will be apparent to those skilled in the art. In addition to the means of securing the rimless lenses to the adapters as shown herein, other mechanisms such as spring-loaded clamps, pegs or adhesives could be employed.

While the conventional designations for radius of curvature as used herein are the industry known standards (Base 8 and Base 6 curvatures), the disclosed sports glasses construction may be used for any lenses which have differing radii of curvature.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. An eyeglass construction for enabling the use of either first wrap-around lenses of a first radius of curvature or second lenses of a second larger radius of curvature comprising a frame having a pair of channels for receiving said first lenses, said first lenses being selectively removable from said frame, and a pair of adapter members, each adapter member having an upper portion shaped and sized to interfit into said channel in said frame and to be selectively removable therefrom and having a lower portion including a coupling device for securing said adapter member to each of said second lenses, said lower portion engaging an upper peripheral edge of said lenses while leaving lower peripheral edges of said lenses exposed to provide a semi-rimless construction.

2. The construction of claim 1 wherein said second lenses each include a peripheral groove supporting an eyewire and said coupling device comprises a locking channel guide on each side of said adapter member for engaging said eyewire.

3. The construction of claim 1 where said second lenses each include at least one mounting hole and said adapter member includes a lower inner surface region having at least one aperture aligning with said mounting hole for receiving a screw.

4. A sports glasses construction comprising:
   a) a frame having a pair of channels for receiving a first respective pair of lenses of a first curvature; and
   b) a pair of lens adapters having
      1) respective upper rib members sized and shaped to fit into said respective pair of channels in said frame; and
      2) said pair of lens adapters having a lower portion sized and shaped to receive a second respective pair of lenses having a second curvature wherein said second curvature is greater than said first curvature, said lenses engaging said lower portions of said adapter along an upper periphery thereof to provide a semi-rimless construction.

5. The sports glasses construction of claim 4 wherein said pair of lens adapters each include a fastener for selectively removably fastening said second respective pair of lenses to said lens adapters.

6. The sports glasses construction of claim 5 wherein said fastener comprises a locking channel guide for receiving a tensioned wire or string wound about a lower periphery of each of said lenses.

7. The sports glasses construction of claim 4 wherein said fastener comprises a screw-type fastener for connecting each of said lenses to said lens adapters.

8. A sports glasses construction comprising:
   a) a frame having a pair of channels for receiving a first respective pair of lenses of a first curvature; and
   b) a pair of lens adapters having
      1) respective upper rib members sized and shaped to fit into said respective pair of channels in said frame; and
      2) said pair of lens adapters each having at least one attachment device for fastening to each of a pair of second lenses of a second curvature wherein said second curvature is greater than said first curvature, said lenses having an upper peripheral edge engaged by said lens adapters and a lower exposed peripheral edge.

9. The sports glasses construction of claim 8 wherein said attachment device comprises at least one lower receiving surface on each lens adapter curved to fit said second lenses and having holes for receiving an attachment member.

10. The sports glasses construction of claim 8 wherein said attachment device comprises a pair of flexible arm members integral to each adapter which clamp to opposite sides of each of said second lenses.

11. A sports glasses construction comprising:
   a) a frame having a pair of channels for receiving a first respective pair of lenses having a first radius of curvature;
   b) a pair of lens adapters having
      1) respective upper rib members sized and shaped to fit into said respective pair of channels in said frame; and
      2) respective lower rib portions having inner surfaces shaped to receive second lenses having a second radius of curvature greater than said first radius of curvature; and,
   c) fasteners for securing said second lenses to said lower rib portions to provide a semi-rimless construction wherein said second lenses have exposed lower peripheral portions.

12. The sports glasses construction of claim 11 wherein said fastener is a screw.

13. The sports glasses construction of claim 11 wherein said rib portion has an inner surface conforming to the curvature of said second lens.

14. The sports glasses construction of claim 11 wherein said fasteners comprise flexible arm members integral to each adapter which clamp to opposite sides of each of said second lenses.

* * * * *